United States Patent
Groll et al.

(10) Patent No.: US 10,905,279 B2
(45) Date of Patent: Feb. 2, 2021

(54) LID HOLDER

(71) Applicant: All-Clad Metalcrafters LLC, Canonsburg, PA (US)

(72) Inventors: William A. Groll, McMurray, PA (US); Bruce W. Perry, Canonsburg, PA (US)

(73) Assignee: All-Clad Metalcrafters, L.L.C., Canonsburg, PA (US)

(*) Notice: Subject to any disclaimer, the term of this patent is extended or adjusted under 35 U.S.C. 154(b) by 0 days.

(21) Appl. No.: 16/162,649

(22) Filed: Oct. 17, 2018

(65) Prior Publication Data

US 2019/0110637 A1    Apr. 18, 2019

Related U.S. Application Data (60) Provisional application No. 62/574,093, filed on Oct. 18, 2017.

(51) Int. Cl.
*A47J 36/12* (2006.01)
*A47J 47/16* (2006.01)

(52) U.S. Cl.
CPC ............. *A47J 36/12* (2013.01); *A47J 47/16* (2013.01)

(58) Field of Classification Search
CPC ........... A47J 36/00–12; A47J 47/00–16; A47J 45/00–10; B65D 23/00; B65D 23/104; B65D 63/18; B65D 2525/28; B65D 2525/281; B65D 2525/289
USPC ..... 220/744, 752, 754, 756, 694, 912, 573.1
See application file for complete search history.

(56) References Cited

U.S. PATENT DOCUMENTS

| | | | |
|---|---|---|---|
| 928,855 A | | 7/1909 | Dixon |
| 1,110,945 A | * | 9/1914 | Kinsman ................... B25B 9/02 |
| | | | 294/99.2 |
| 1,459,862 A | | 6/1923 | Scudder |
| 1,976,623 A | * | 10/1934 | Monroe .................... B67B 7/18 |
| | | | 81/3.4 |
| 2,516,088 A | | 7/1950 | Einhorn |
| 4,070,050 A | | 1/1978 | Glock et al. |
| 4,915,433 A | | 4/1990 | Schafer |
| 5,683,010 A | * | 11/1997 | Boyajian, Jr. ........... A47J 36/12 |
| | | | 220/744 |

(Continued)

FOREIGN PATENT DOCUMENTS

| DE | 587800 | 11/1933 |
|---|---|---|
| DE | 202005018089 U1 | 4/2006 |

(Continued)

*Primary Examiner* — Kareen K Thomas
(74) *Attorney, Agent, or Firm* — The Webb Law Firm (57) ABSTRACT

A lid holder has a base portion and a pair of spaced apart arms having a proximal end connected to the base portion and a free distal end extending away from the base portion. The lid holder further has a U-shaped lug at the free distal end of each arm, the lug having a first end and a second end directed toward the base portion, and a leg connected to the second end of each U-shaped lug, the leg protruding in an outward direction away from the arms. The arms are deflectable from a first position to a second position with application of a deflecting force such that at least a portion of the arms is insertable between vertically extending posts of a lid handle. After a deflecting force is removed, the arms revert back toward the first position, thereby engaging the legs with the vertically extending posts of the lid handle.

19 Claims, 10 Drawing Sheets

(56) References Cited

U.S. PATENT DOCUMENTS

| | | | | |
|---|---|---|---|---|
| 2003/0173313 A1* | 9/2003 | Morgan | ............... | A47F 5/01 |
| | | | | 211/41.11 |
| 2004/0007545 A1* | 1/2004 | Morgan | ............ | A47J 47/16 |
| | | | | 211/41.11 |
| 2004/0251222 A1* | 12/2004 | Ohanian | ............ | A47J 47/16 |
| | | | | 211/41.11 |
| 2006/0186124 A1* | 8/2006 | Sergianni | ............ | A47J 47/16 |
| | | | | 220/572 |
| 2006/0261021 A1* | 11/2006 | Stagnaro | .......... | A47F 5/0884 |
| | | | | 211/119 |
| 2009/0230134 A1* | 9/2009 | Romandy | ........... | A47J 36/12 |
| | | | | 220/573.1 |
| 2009/0272749 A1* | 11/2009 | Romandy | ........... | A47J 36/12 |
| | | | | 220/573.1 |
| 2014/0008315 A1* | 1/2014 | Elly | ................ | A47J 36/12 |
| | | | | 211/41.11 |
| 2015/0014495 A1* | 1/2015 | Bausman | ............ | A47J 47/16 |
| | | | | 248/176.2 |
| 2016/0374506 A1* | 12/2016 | Bui | ................ | A47J 36/12 |
| | | | | 220/744 |
| 2018/0146827 A1* | 5/2018 | Clarke | ............... | A47B 55/02 |

FOREIGN PATENT DOCUMENTS

| | | |
|---|---|---|
| EP | 0230872 A1 | 8/1987 |
| GB | 425140 | 3/1935 |
| GB | 2326081 | 12/1998 |
| WO | WO 97/09915 | 3/1997 |

\* cited by examiner

LID HOLDER

CROSS-REFERENCE TO RELATED APPLICATIONS

This application claims priority to U.S. Provisional Application No. 62/574,093 filed on Oct. 18, 2017, the disclosure of which is incorporated by reference herein in its entirety.

BACKGROUND OF THE INVENTION

Field of the Invention

The present invention relates generally to a lid holder configured for use with a lid having a handle for enclosing a pot or a pan, and more specifically to a lid holder configured for engaging the handle of the lid and for allowing movement of the lid between a closed position and an open position.

Description of the Related Art

When cooking a food product within a pot or pan, it is often desirable to use a lid to enclose the pot or the pan. When using the lid, it often becomes necessary to remove the lid in order to gain access to the interior of the pot or the pan, such as to add additional ingredients or mix the contents of the pot or the pan. However, the simple act of removing the lid poses several challenges for the user. One challenge is the risk of burns to the user while handling the lid. The handle of the lid is often too hot to touch with bare hands. Unless a separate, insulated lid holder is used, the user risks burning his/her hand(s) while handling the hot lid. Furthermore, steam escaping the pot or pan is often directed toward the user as the lid is lifted from the pot or pan. Another challenge is lid storage while the lid is temporarily removed, such as when mixing the contents of the pot or the pan. The user must assure that there is adequate space on the working surface surrounding the pot or the pan to rest the lid. In addition, an inside surface of the lid often has condensation from the cooking food product that drains onto the working surface, thereby requiring additional cleanup efforts. Many existing lid holders are not configured to prevent scratching of the lid, such as the upper lid surface or the lid handle. While there are various devices to assist with the removal and storage of the lid, there exists a need in the art for a new and more efficient, safer, and ergonomically designed assembly to allow for moving the lid between a closed position and an open position.

SUMMARY OF THE INVENTION

In some preferred and non-limiting examples, provided is a lid holder that may be constructed from a continuous length of a wire rod. The lid holder may have a base portion defining a closed end and a pair of spaced apart arms, each arm having a proximal end connected to the base portion and a free distal end extending in a direction away from the base portion. The lid holder may further have a U-shaped lug at the free distal end of each arm, the lug having a first end connected to the free distal end of each arm and a second end directed toward the base portion. The lid holder may further have a leg connected to the second end of each U-shaped lug, the leg protruding in an outward direction away from the arms. The arms may be deflectable from a first, undeflected position to a second, deflected position with application of a deflecting force on at least a portion of at least one arm such that at least a portion of the arms is insertable between vertically extending posts of a lid handle and such that at least a portion of the U-shaped lug is positioned over an upper surface of a horizontal handling portion of the lid handle. After a deflecting force is removed, the arms may revert back from the second, deflected position toward the first, undeflected position, thereby engaging the legs of the U-shaped lug with the vertically extending posts of the lid handle.

In other preferred and non-limiting examples, the base portion may be U-shaped. The proximal end of each arm may be connected to the base portion by a hook portion. The hook portion may be S-shaped with a first curved portion and a second curved portion. The first and second curved portions may have a radius of curvature of about 3 mm to about 8 mm, preferably about 5 mm to about 6 mm. A major longitudinal axis of each lug may be substantially parallel with the major longitudinal axis of the arm that the lug is connected to. Each lug may have a radius of curvature of about 6 mm to about 10 mm. The distal ends of the arms may be angled away from one another or be parallel to one another. A major longitudinal axis of the base portion may be angled relative to a major longitudinal axis of the lid holder at an angle of about 0° and about 15. The legs and the U-shaped lug may maintain the lid holder away from an upper surface of a lid to prevent scratching of the upper surface of the lid. At least a portion of the lid holder may have a protective coating configured to prevent scratching of the handle when the lid holder is connected to the lid. The lid holder may be constructed from the wire rod having a diameter of about 3 mm to about 6 mm, preferably about 4 mm. The lid holder may be made from stainless steel, such as 304 or 410 grade stainless steel.

In other preferred and non-limiting examples, when connected to a lid covering a cooking vessel, the lid holder and the lid may be movable between a lowered position, where the lid engages a rim of the cooking vessel, and a raised position, where the lid holder engages at least one of the rim of the cooking vessel between the base portion and the hook portion and a surface supporting the cooking vessel. A bottom portion of the lid may be supported by the arms of the lid holder in the raised position.

In other preferred and non-limiting examples, a lid holder may have a base portion having a pair of free ends and a hook portion connected to each of the free ends of the base portion. The lid holder may further have a pair of arms spaced apart from each other, each arm having a proximal end connected to the hook portion and a free distal end extending away from the proximal end. The lid holder may further have a U-shaped lug at the free distal end of each arm. The lug may have a first end connected to the free distal end of each arm and a second end directed toward the base portion. A leg may be connected to the second end of each U-shaped lug, the leg protruding in an outward direction away from the arms. The legs and the U-shaped lug may maintain the lid holder away from an upper surface of a lid to prevent scratching of the upper surface of the lid.

Further preferred and non-limiting examples will now be set forth in the following numbered clauses.

Clause 1: A lid holder constructed from a continuous length of a wire rod, the lid holder comprising: a base portion; a pair of spaced apart arms, each arm having a proximal end connected to the base portion and a free distal end extending away from the base portion; a U-shaped lug at the free distal end of each arm, the lug having a first end connected to the free distal end of each arm and a second end directed toward the base portion; and a leg connected to the second end of each U-shaped lug, the leg protruding in an outward direction away from the arms, wherein the arms are deflectable from a first, undeflected position to a second, deflected position with application of a deflecting force on at least a portion of at least one arm such that at least a portion of the arms is insertable between vertically extending posts of a lid handle and such that at least a portion of the U-shaped lug is positioned over an upper surface of a horizontal handling portion of the lid handle, and wherein, after a deflecting force is removed, the arms revert back from the second, deflected position toward the first, undeflected position, thereby engaging the legs of the U-shaped lug with the vertically extending posts of the lid handle.

Clause 2. The lid holder of clause 1, wherein the base portion is U-shaped.

Clause 3. The lid holder of clause 1 or clause 2, wherein the proximal end of each arm is connected to the base portion by a hook portion.

Clause 4. The lid holder of clause 3, wherein the hook portion is S-shaped with a first curved portion and a second curved portion.

Clause 5. The lid holder of clause 4, wherein the first curved portion has a radius of curvature of about 3 mm to about 8 mm and wherein the second curved portion has a radius of curvature of about 3 mm to about 8 mm.

Clause 6. The lid holder of claim 1, wherein a major longitudinal axis of each lug is substantially parallel with the major longitudinal axis of the arm that the lug is connected to.

Clause 7. The lid holder of any of clauses 1-6, wherein each lug has a radius of curvature of about 6 mm to about 10 mm.

Clause 8. The lid holder of any of clauses 1-7, wherein the distal ends of the arms are angled away from one another.

Clause 9. The lid holder of any of clauses 1-8, wherein the arms are parallel to one another.

Clause 10. The lid holder of any of clauses 1-9, wherein a major longitudinal axis of the base portion is angled relative to a major longitudinal axis of the lid holder at an angle of about 0° and about 15°.

Clause 11. The lid holder of any of clauses 1-10, wherein the legs and the U-shaped lug maintain the lid holder away from an upper surface of a lid to prevent scratching of the upper surface of the lid.

Clause 12. The lid holder of any of clauses 1-11, wherein at least a portion of the lid holder has a protective coating configured to prevent scratching of the handle when the lid holder is connected to the lid.

Clause 13. The lid holder of any of clauses 1-12, wherein the lid holder is constructed from the wire rod having a diameter of about 3 mm to about 6 mm.

Clause 14. The lid holder of any of clauses 1-13, wherein the lid holder is made from stainless steel.

Clause 15. The lid holder of any of clauses 1-14, wherein, when connected to a lid covering a cooking vessel, the lid holder and the lid are movable between a lowered position, where the lid engages a rim of the cooking vessel, and a raised position, where the lid holder engages the rim of the cooking vessel between the base portion and the hook portion.

Clause 16. The lid holder of clause 15, wherein a bottom portion of the lid is supported by the arms of the lid holder in the raised position.

Clause 17. The lid holder of any of clauses 1-14, wherein, when connected to a lid covering a cooking vessel, the lid holder and the lid are movable between a lowered position, where the lid engages a rim of the cooking vessel, and a raised position, where the lid holder engages at least one of the rim of the cooking vessel and a surface supporting the cooking vessel.

Clause 18. The lid holder of clause 17, wherein a bottom portion of the lid is supported by the arms of the lid holder in the raised position.

Clause 19. A lid holder comprising: a base portion having a pair of free ends; a hook portion connected to each of the free ends of the base portion; a pair of arms spaced apart from each other, each arm having a proximal end connected to the hook portion and a free distal end extending away from the proximal end; a U-shaped lug at the free distal end of each arm, the lug having a first end connected to the free distal end of each arm and a second end directed toward the base portion; and a leg connected to the second end of each U-shaped lug, the leg protruding in an outward direction away from the arms.

Clause 20. The lid holder of clause 19, wherein the legs and the U-shaped lug maintain the lid holder away from an upper surface of a lid to prevent scratching of the upper surface of the lid.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

In FIGS. 1-8C, like characters refer to the same components and elements, as the case may be, unless otherwise stated.

DETAILED DESCRIPTION OF THE PREFERRED EMBODIMENTS

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.10, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

In various preferred and non-limiting embodiments or aspects, the present disclosure is directed to a lid holder 100 configured for use with a lid having a handle. The lid holder 100 is configured to allow handling of the lid between a closed position, where the lid encloses a cooking vessel, such as pot or a pan, and an open position, where the lid is removed to allow access to the interior of the cooking vessel. While the present disclosure discusses the lid holder 100 as a separate component that is removably attachable to the lid, in some examples the lid holder 100 can be integrated with the lid as a single, integral unit.

Figure 1:
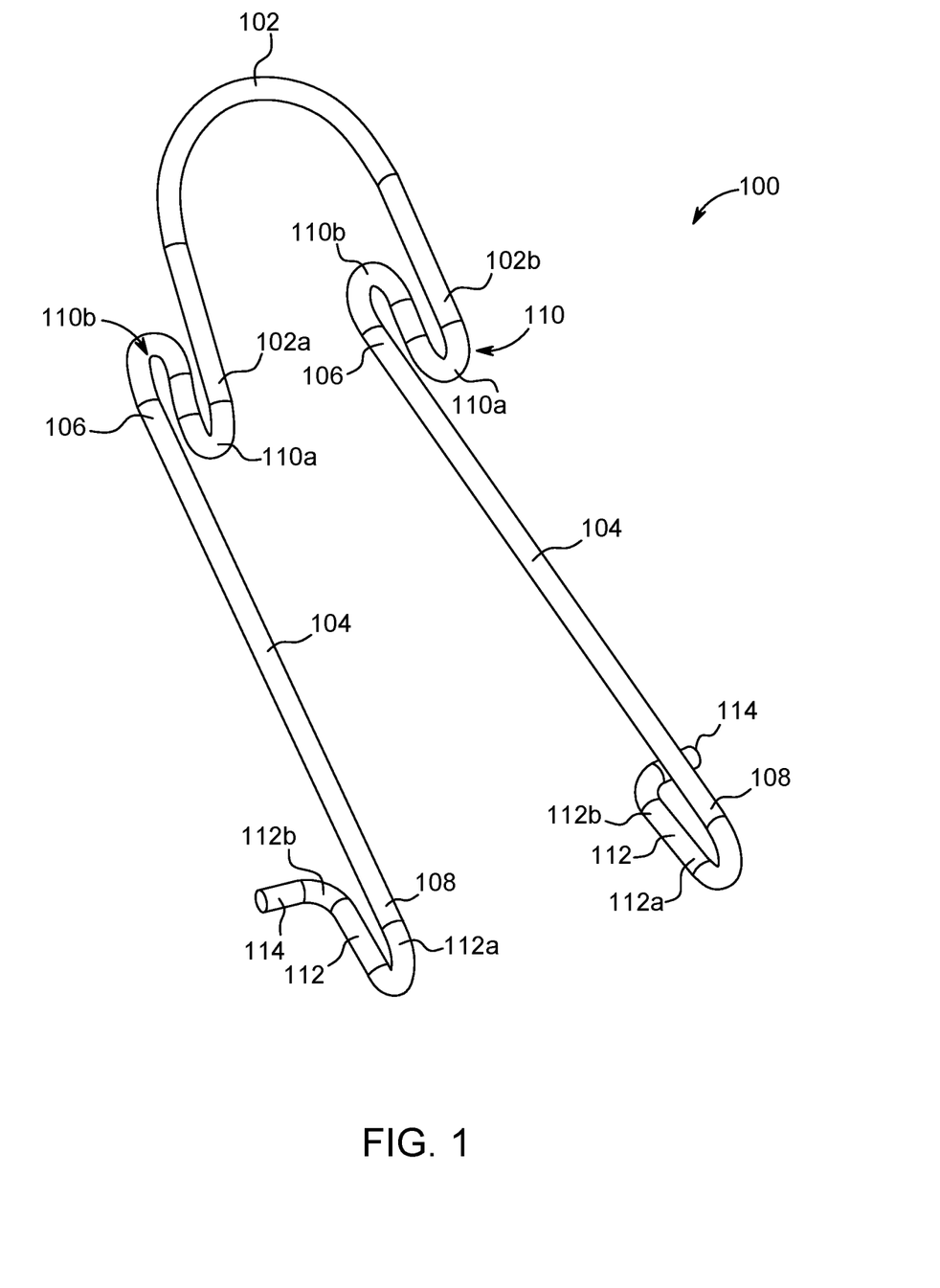
FIG. 1 is a front perspective view of a lid holder in accordance with one preferred and non-limiting example of the present invention.
Figure 2:
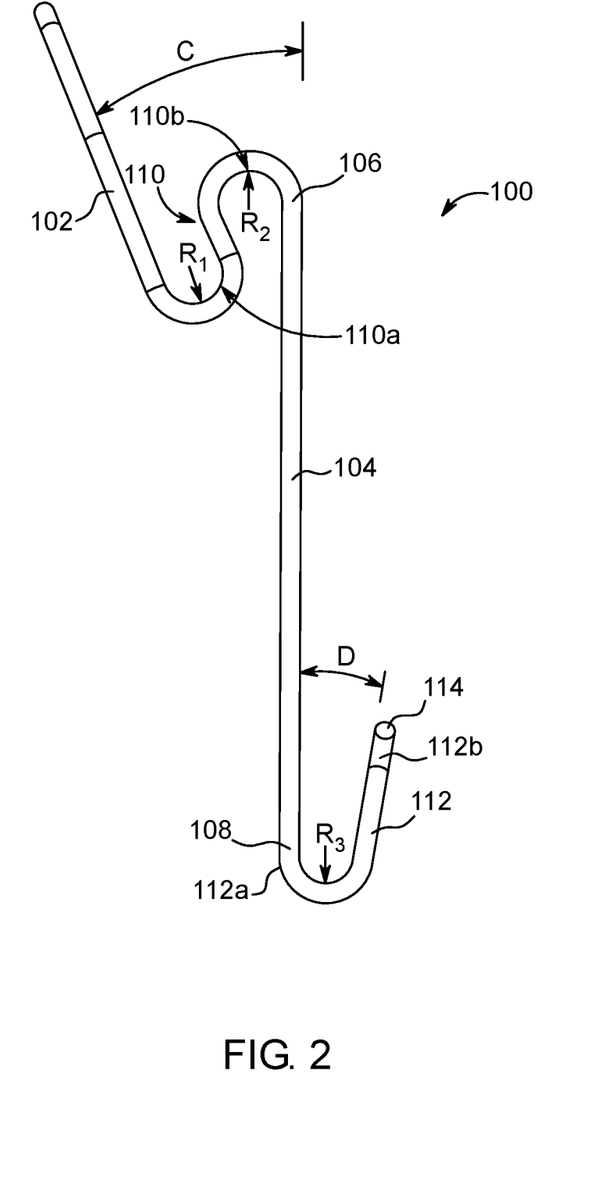
FIG. 2 is a side view of the lid holder shown in FIG. 1.
Figure 3:
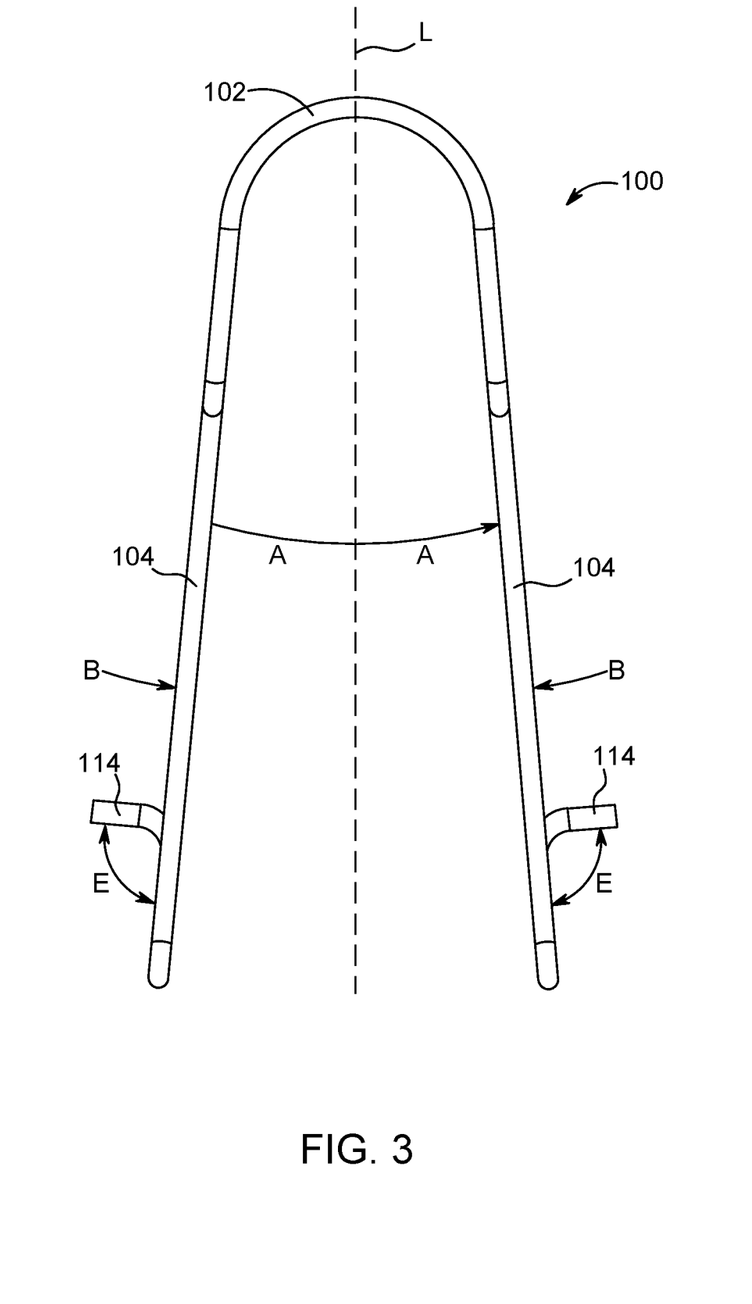
FIG. 3 is a front view of the lid holder shown in FIG. 1.

With reference to FIGS. 1-3, the lid holder 100 is shown in accordance with one example of the present disclosure. The lid holder 100 is constructed from a single, continuous length of wire rod. In some examples, the wire rod may have a circular cross-section. In other examples, the wire rod may have a non-circular cross-section, such as an oval, square, rectangular, triangular, or other geometric shape cross-section. In various examples, the lid holder 100 may be construed from a wire rod having a uniform diameter along its entire length. For example, the lid holder 100 may be constructed from a wire rod having a diameter between about 3 mm to about 6 mm, preferably about 4 mm. In other examples the lid holder 100 may be construed from a wire rod having a non-uniform diameter along at least a portion of its length. For example, the lid holder 100 may be construed from a single-continuous length of wire rod having a first diameter (or first cross-sectional area) in a first portion, and a second diameter (or second cross-sectional area) in a second portion. The wire rod may be solid or at least partially hollow.

In some examples, the lid holder 100 can be made from a metal material, such as stainless steel, a plastic composite material, or a combination thereof. For example, the lid holder 100 may be made from stainless steel wire rod, such as 304 grade or 410 grade stainless steel. In examples where the lid holder 100 is made from metal, at least a portion of the lid holder 100 may be heat treated to achieve the desired strength and spring-like properties. For example, in embodiments where the lid holder 100 is made from 410 grade stainless steel, the lid holder 100 may be bent to its desired shape while the material is in its annealed state to allow for easier bending of the metal. After bending the lid holder 100 to the desired shape, the material is hardened to at least ½ hardened state to provide the material of the lid holder 100 with the spring-like properties in its finished state. At least a portion of the lid holder 100 may have a protective coating, such as a rubberized coating, to prevent scratching of a lid handle and/or upper surface of the lid when the lid holder 100 is connected to the lid.

With continued reference to FIGS. 1-3, the lid holder 100 has a base portion 102 and a pair of spaced apart arms 104 extending from the base portion 102. The base portion 102 may be substantially U-shaped with a first end 102a and a second end 102b. The base portion 102 defines a closed end of the lid holder 100, while the spaced apart arms 104 define an open end of the lid holder 100. The first of the spaced apart arms 104 extends from the first end 102a of the base portion 102, while the second of the spaced apart arms 104 extends from the second end 102b of the base portion 102. In some examples, the spaced apart arms 104 extend in a direction substantially parallel to one another. In other examples, the spaced apart arms 104 extend at an angle A relative to a major longitudinal axis L (shown in FIG. 3) such that the arms 104 extend away from one another or toward one another. The angle A may be between about 0° and about 15° relative to the major longitudinal axis L of the lid holder 100. In some examples, the arms 104 are spread apart away from one another to provide spring-like properties when the arms 104 are urged in a direction toward one another.

The arms 104 have a proximal end 106 connected to the base portion 102 and a distal end 108 extending away from the proximal end 106. The arms 104 may have the same or different shape to one another. For example, at least one of the arms 104 may be substantially linear along its length. In other examples, at least one of the arms 104 may be curvilinear along its length.

The arms 104 have spring-like properties in that the arms 104 can be deflected from a first, undeflected position to a second, deflected position with application of a deflecting force on at least a portion of at least one arm 104 in a direction of arrows B shown in FIG. 3. After a deflecting force is removed, the arms 104 revert back from the second, deflected position to the first, undeflected position. Movement of the arms 104 from the undeflected to a deflected position builds a restoring force in the lid holder 100 which forces the arms to the undeflected position after the deflecting force is removed. In this manner, the distal end 108 of each arm 104 is flexible and can be moved relative to the proximal end 106. For example, the arms 104 can be urged toward one another by applying a deflecting force on at least a portion of at least one of the arms 104 to bring the distal ends 108 of the arms 104 closer together. By removing or reducing the deflecting force, the distal ends 108 of the arms 104 will be distanced away from each other. The distal ends 108 of the arms 104 will revert to their original position when the deflecting force is completely removed.

With specific reference to FIGS. 1-2, the proximal end 106 of each arm 104 may be connected to the first and second ends 102a, 102b of the base portion 102 by a hook portion 110. In some examples, the hook portion 110 may be substantially S-shaped with a first curved portion 110a and a second curved portion 110b. In some examples, the first and second curved portions 110a, 110b may have an identical shape. In other examples, the first and second curved portions 110a, 110b may have a different shape. In various examples, the first and second curved portions 110a, 110b may have a radius of curvature $R_1$, $R_2$ of about 3 mm to about 8 mm, such as about 5 mm to about 6 mm. The hook portion 110 may be arranged such that it is in the same plane as each of the arms 104 (see FIG. 3). In some examples, the hook portion 110 may be arranged such that the base portion 102 is arranged at an angle C relative to the arms 104 when viewed from the side (see FIG. 2). The angle C may be between about 20° and about 40°.

With continued reference to FIGS. 1-3, the distal end 108 of each arm 104 may have a lug 112. The lug 112 is monolithically formed with each arm 104 at the distal end 108 thereof. Each lug 112 is substantially U-shaped with a first end 112a connected to the distal end 108 of each arm 104 and a second end 112b extending in a direction toward the proximal end 106 of each arm 104. In some examples, a major longitudinal axis of each lug 112 is substantially parallel with the major longitudinal axis of each arm 104 that the lug 112 is connected to. In other examples, at least one of the lugs 112 may be angled toward the base portion 102 or away from the base portion 102. In various examples, each lug 112 may have a radius of curvature $R_3$ of about 6 mm to about 10 mm. With reference to FIG. 2, the second end 112b of at least one lug 112 may be arranged at an angle D relative to the major longitudinal axis of the arms 104. The angle D may be between about 0° and about 20°. The angle D is selected to maintain the arms 104 in a spaced apart relationship from an upper surface of the lid in order to prevent scratching of the cosmetic finish of the lid. The second end 112b of each lug 112 terminates in outwardly protruding legs 114. In some examples, such as shown in FIG. 3, each leg 114 may be arranged at an angle E that is substantially perpendicular to the direction of the major longitudinal axis of each lug 112 and/or each arm 104. The angle E may be between about 70° and about 90°.

Figure 4:
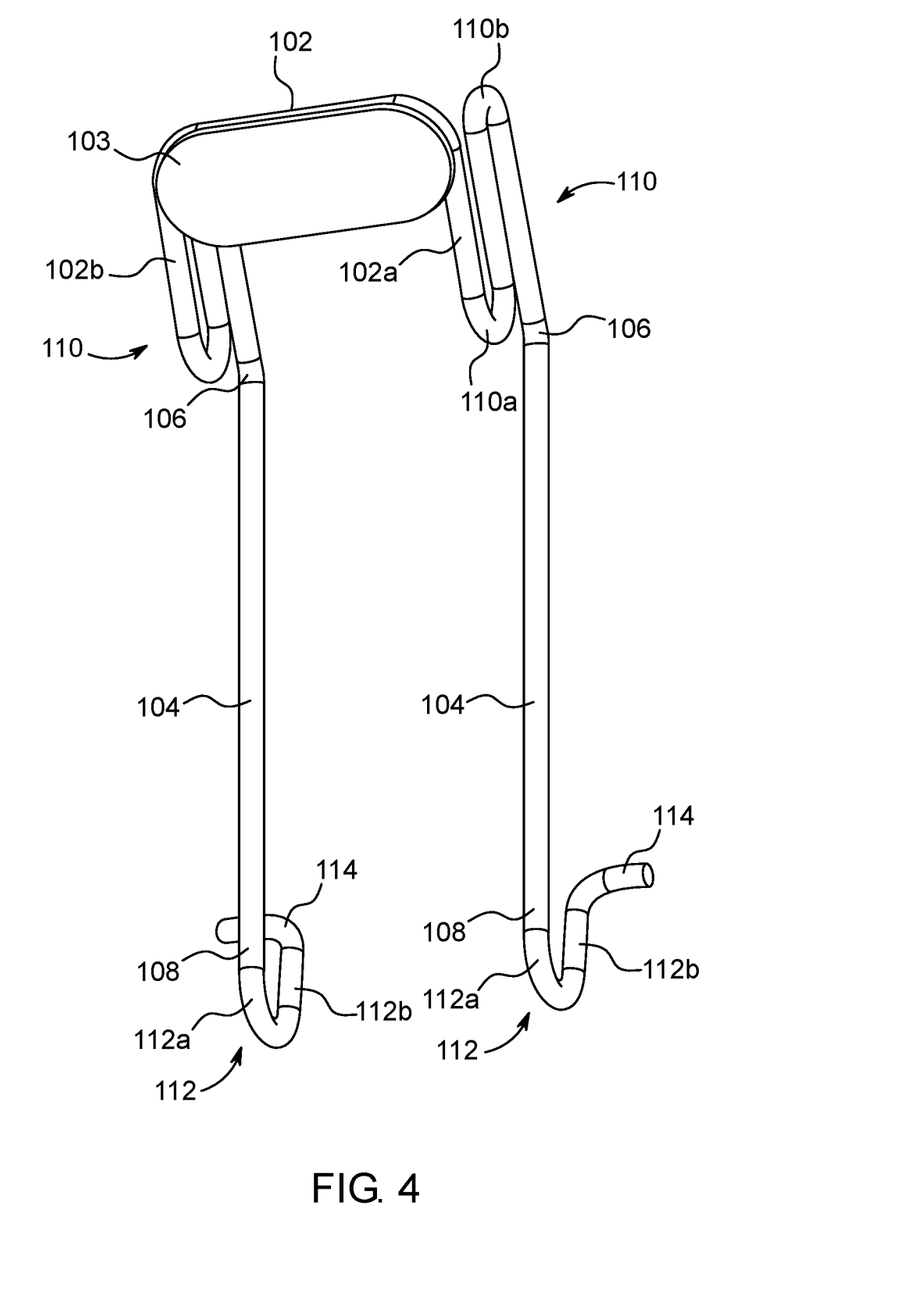
FIG. 4 is a front perspective view of a lid holder in accordance with another preferred and non-limiting example of the present invention.
Figure 5:
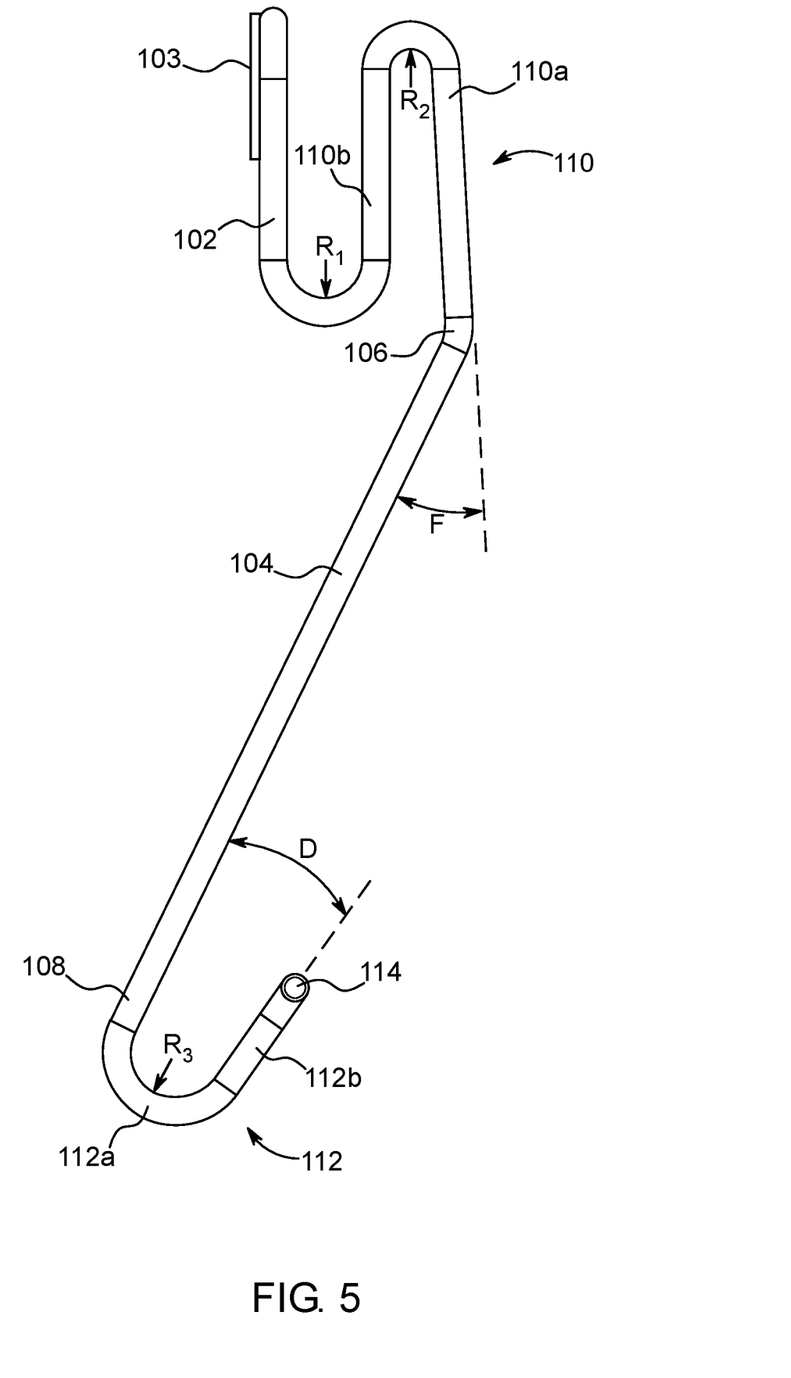
FIG. 5 is a side view of the lid holder shown in FIG. 4.
Figure 6:
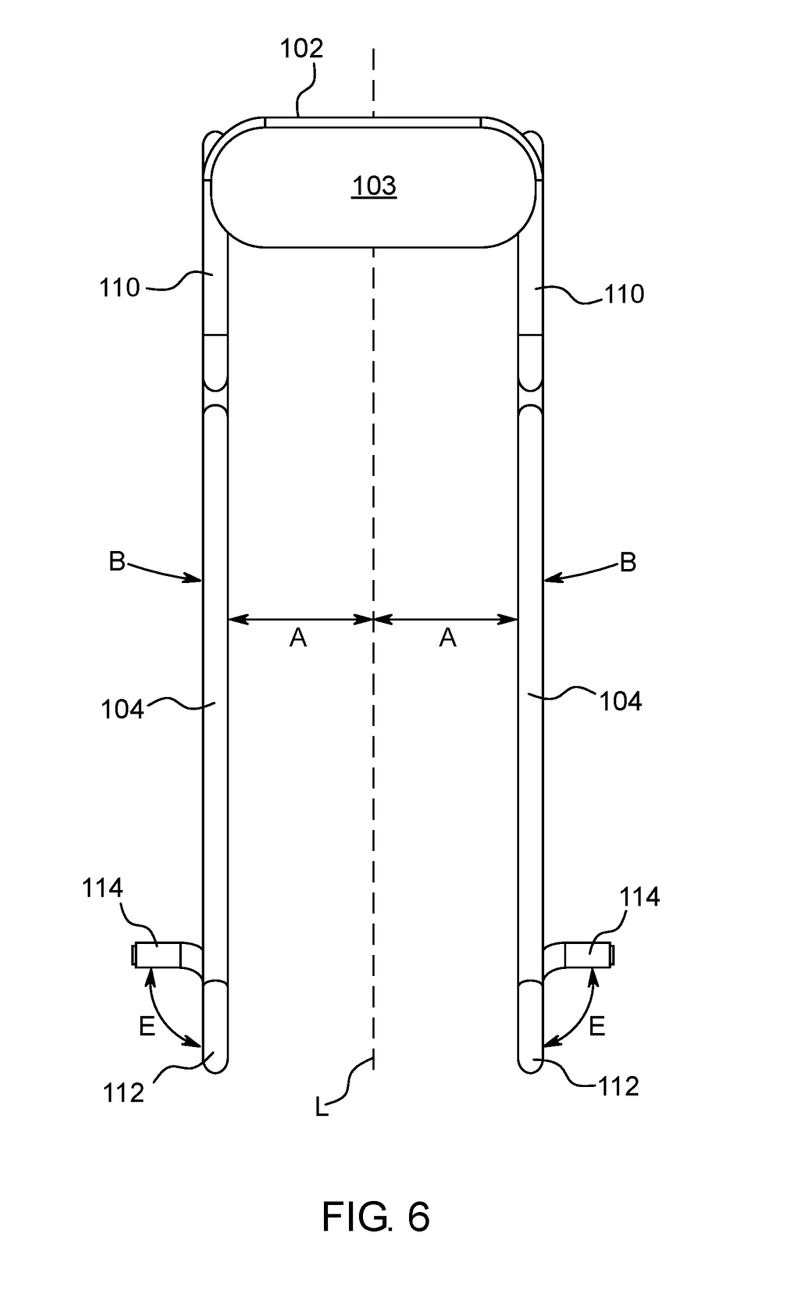
FIG. 6 is a front view of the lid holder shown in FIG. 4.

With reference to FIGS. 4-6, the lid holder 100 is shown in accordance with another example of the present disclosure. The components of the lid holder 100 shown in FIGS. 4-6 are substantially similar or identical to the components of the lid holder 100 described herein with reference to FIGS. 1-3. As the previous discussion regarding the lid holder 100 generally shown in FIGS. 1-3 is applicable to the lid holder 100 shown in FIGS. 4-6, same reference numerals are used to identify same components.

The lid holder 100 shown in FIGS. 4-6 has a base portion 102 and a pair of spaced apart arms 104 extending from the base portion 102. The base portion 102 may be substantially U-shaped with a first end 102a and a second end 102b. The base portion 102 defines a closed end of the lid holder 100, while the spaced apart arms 104 define an open end of the lid holder 100. With specific reference to FIG. 4, a support member 103, such as a plate, may be connected to at least a part of the base portion 102 between the first and second ends 102a, 102b. In some examples, the support member 103 may provide additional structural rigidity to the lid holder 100 in the area of the base portion 102. In some examples, an identifying indicia (not shown) may be provided on at least a portion of the support member 103.

With continued reference to FIG. 4, the first of the spaced apart arms 104 extends from the first end 102a of the base portion 102, while the second of the spaced apart arms 104 extends from the second end 102b of the base portion 102. In some examples, the spaced apart arms 104 extend in a direction substantially parallel to one another. In other examples, the spaced apart arms 104 extend at an angle A (shown in FIG. 6) relative to a major longitudinal axis L of the lid holder 100 such that the arms 104 extend away from one another or toward one another. The angle A may be between about 0° and about 15° relative to the major longitudinal axis L of the lid holder 100. In some examples, the arms 104 are spread apart away from one another to provide spring-like properties when the arms 104 are urged in a direction toward one another.

The arms 104 have a proximal end 106 connected to the base portion 102 and a distal end 108 extending away from the proximal end 106. The arms 104 may have the same or different shape to one another. For example, at least one of the arms 104 may be substantially linear along its length. In other examples, at least one of the arms 104 may be curvilinear along its length. The arms 104 have spring-like properties in that the arms 104 can be deflected from a first, undeflected position to a second, deflected position with application of a deflecting force on at least a portion of at least one arm 104 in a direction of arrows B shown in FIG. 6.

With continued reference to FIG. 4, the proximal end 106 of each arm 104 may be connected to the first and second ends 102a, 102b of the base portion 102 by a hook portion 110. In some examples, the hook portion 110 may be substantially S-shaped with a first curved portion 110a and a second curved portion 110b. In some examples, the first and second curved portions 110a, 110b may have an identical shape. In other examples, the first and second curved portions 110a, 110b may have a different shape. In various examples, the first and second curved portions 110a, 110b may have a radius of curvature $R_1$, $R_2$ of about 3 mm to about 8 mm, such as about 5 mm to about 6 mm. The hook portion 110 may be arranged such that it is in the same plane as each of the arms 104 (see FIG. 6).

In some examples, the base portion 102 and/or the hook portion 110 may be arranged at an angle relative to the major longitudinal axis of the arms 104. With reference to FIG. 5, the base portion 102 and/or the hook portion 110 may be arranged at an angle F relative to the major longitudinal axis of the arms 104 when viewed from the side. The angle F may be between about 20° and about 40°. The angle F of the base portion 102 and/or the hook portion 110 relative to the arms 104 is selected such that the lid holder 100 maintains the center of gravity of the lid 200 at a position where the lid 200 will not be urged from the open position to the closed position on the cooking vessel 202 (see FIG. 7D).

With continued reference to FIG. 4, the distal end 108 of each arm 104 may have a lug 112. The lug 112 is monolithically formed with each arm 104 at the distal end 108 thereof. Each lug 112 is substantially U-shaped with a first end 112a connected to the distal end 108 of each arm 104 and a second end 112b extending in a direction toward the proximal end 106 of each arm 104. In some examples, a major longitudinal axis of each lug 112 is substantially parallel with the major longitudinal axis of each arm 104 that the lug 112 is connected to. In other examples, at least one of the lugs 112 may be angled toward the base portion 102 or away from the base portion 102. In various examples, each lug 112 may have a radius of curvature $R_3$ of about 6 mm to about 10 mm (see FIG. 5).

The second end 112b of at least one lug 112 may be arranged at an angle F (shown in FIG. 5) relative to the major longitudinal axis of the arms 104. The angle D may be between about 0° and about 20°. The second end 112b of each lug 112 terminates in outwardly protruding legs 114. In some examples, such as shown in FIG. 6, each leg 114 may be arranged at an angle E that is substantially perpendicular to the direction of the major longitudinal axis of each lug 112 and/or each arm 104. The angle E may be between about 70° and about 90°.

Having described the structure of the lid holder 100, a method of using the lid holder 100 with a lid 200 of a cooking vessel 202 will now be described with reference to FIGS. 7A-7D. In various examples, the cooking vessel 202 may be any vessel used for preparing food, such as a pot or a pan. The lid 200 is configured to enclose at least a portion of the interior cavity of the cooking vessel 202. For example, the lid 200 may be dimensioned to fit around an outer circumference of the cooking vessel 202. The lid 200 may have a shape that substantially corresponds to a shape of the cooking vessel 202 defined by a rim 206 of the cooking vessel 202. In some examples, the lid 200 may have a chamfered edge 208 configured to engage with at least a portion of the rim 206 of the cooking vessel 202 (see FIG. 7D).

The lid 200 may have a handle 204 configured for facilitating the handling of the lid 200. For example, the handle 204 may be used to lower and lift the lid 200 to and from the cooking vessel 202. The handle 204 has a substantially U-shaped structure with two substantially vertical posts 204a attached to the lid 200 and a handling portion 204b extending therebetween and offset from an upper surface of the lid 200. In some examples, the handle 204 may be centrally located on the lid 200. In other examples, the handle 204 may be offset relative to a center of the upper surface of the lid 200. One of ordinary skill in the art will readily understand that the lid 200, handle 204, and the cooking vessel 202 are well known in the art and may take a variety of forms and shapes. The lid holder 100 may be configured for use with lids 200 of various sizes, ranging, for example, from 140 mm in diameter to 360 mm in diameter.

Figure 7A:
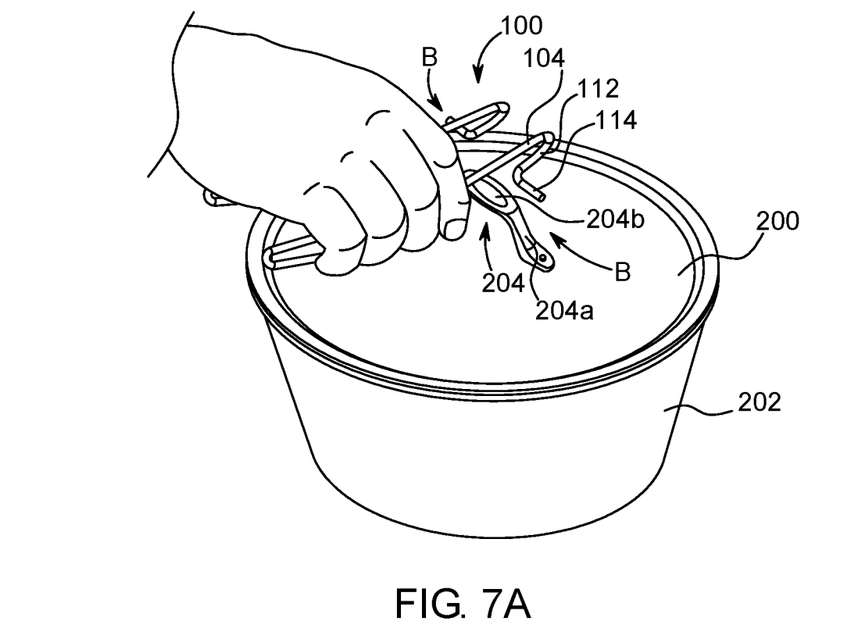
FIGS. 7A-7D are front perspective views of the lid holder shown in FIGS. 1-3 in use with a lid of a cooking vessel.

Referring initially to FIG. 7A, the user grasps the lid holder 100 such that the user's thumb engages one of the arms 104 and at least one of the user's fingers engages the other of the arms 104. Alternatively, the user may grasp each of the arms 104 with one hand. The lid holder 100 is held such that the lugs 112 are pointed in a direction toward the handle 204 of the lid 200. Initially, the lid holder 100 is positioned such that the arms 104 are positioned over the handle 200 and the lugs 112 extend past the handle 204. By applying a force to the arms 104 in a direction of arrows B in FIG. 7A, the user can urge the arms 104 toward each other such that the lugs 112 are also brought closer to each other. The arms 104 are configured to require a certain amount of compressive force before the arms 104 are deflected toward each other such that the lid holder 100 can be fitted between the vertical posts of the handle 204. In some examples, the force that is applied to the arms 104 in the direction of arrows B shown in FIG. 7A may be between about 2 lbs and about 10 lbs, preferably between 2 lbs and 5 lbs. In some examples, the force may be around 3 lbs. In general, the force that must be applied to the arms 104 to urge the arms 104 toward one another is a function of the cross-sectional area of the arms 104 and an angular deflection that is necessary for inserting the legs 114 between the vertical posts of the handle 204.

Figure 7B:
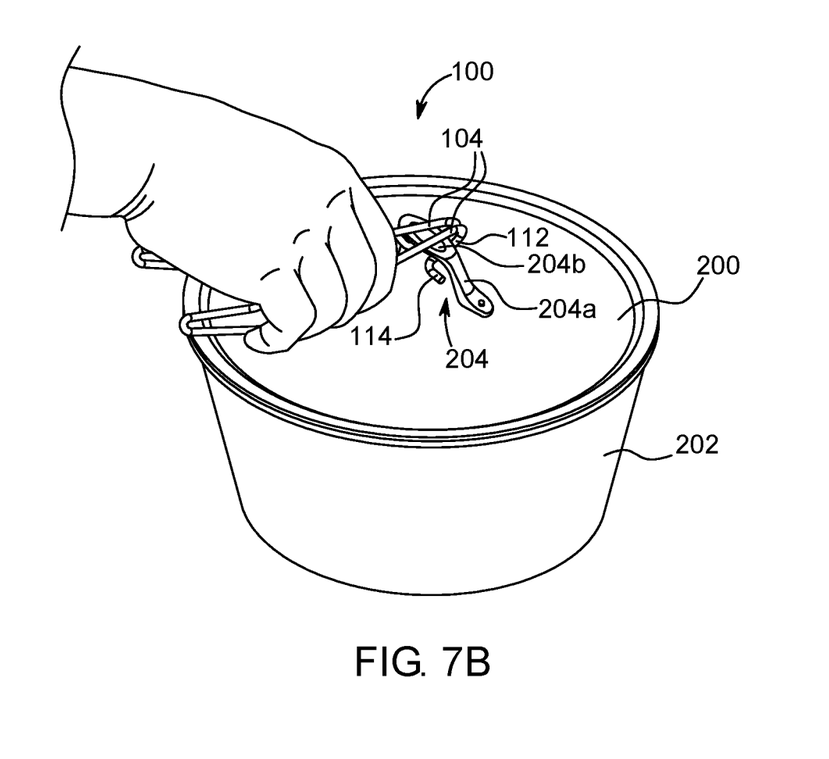

Referring to FIG. 7B, the arms 104 are urged or squeezed together such that a distance between the terminal ends of the legs 114 is less than a distance between the vertical posts of the handle 204 and the lid 200. In some examples, the arms 104 can be urged or squeezed together such that the lugs 112 directly contact each other. After urging or squeezing the arms 104 toward one another, the lid holder 100 is positioned such that the horizontal handling portion 204b of the handle 204 is disposed between the first and second ends 112a, 112b of the lugs 112. In other words, the free, second ends 112b of the lugs 112 are inserted into a space defined between the handle 204 and an upper surface of the lid 200, while the first ends 112a of the lugs 112 are positioned vertically above the horizontal handling portion 204b of the handle 204. The lid holder 100 is further positioned such that the legs 114 are positioned on an opposite side of the handle posts 204a relative to a distal end of the lugs 112.

As described herein, urging or squeezing of the arms 104 toward one another builds a restoring force in the material of the lid holder 100 such that after removal of the force, the arms 104 will tend to spring back toward their initial, undeflected position. By releasing the squeezing force on the arms 104, the lid holder 100 becomes engaged with the handle 204 of the lid 200. Desirably, the arms 104 may spring back from the second, deflected position to an intermediate position that is between the initial, undeflected position, and the second, deflected position that is required to fit the legs 114 through the opening defined between the handle 204 and the upper surface of the lid 200. In this manner, the lid holder 100 may have a built-in restoring force that maintains the lugs 112 in contact with at least a portion of the handle 204, such the vertical posts 204a. In other examples, the arms 104 may spring back from the second, deflected position to the first, undeflected position.

Figure 7C:
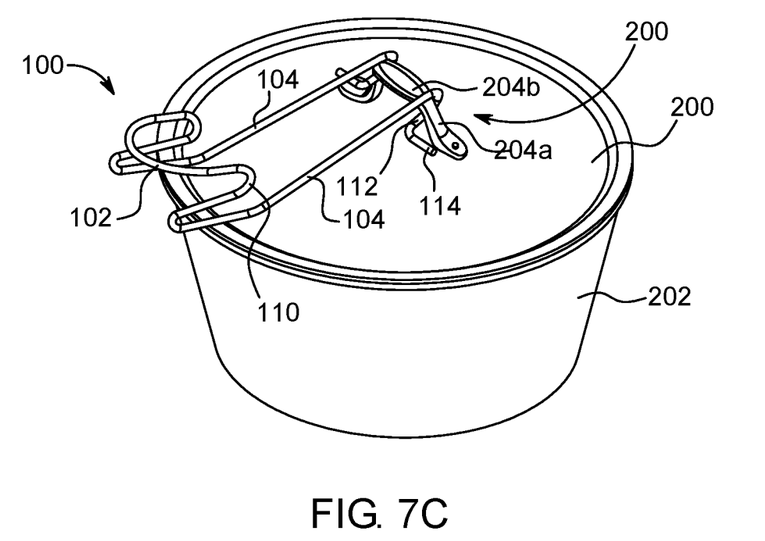

With reference to FIG. 7C, the lid holder 100 is positioned relative to the handle 204 such that the legs 114 extend past the handle posts and prevent withdrawal of the lid holder 100 in a distal direction. The terminal ends of the legs 114 may protrude past the handle posts to prevent scratching the cosmetic finish of the handle 204 and/or the upper surface of the lid 200. Furthermore, the arms 104 are maintained in a spaced apart relationship relative to the upper surface of the lid 200 and the handle 204 to prevent the arms 104 from scratching the surface of the lid 200 and the handle 204. In a lowered position, the lid holder 100 is supported above an upper surface of the lid 200. For example, one end of the lid holder 100, such as the base portion 102, may contact at least a portion of an outside circumference of the lid 200 and the arms 104. In some examples, the base portion 102 of the lid holder 100 may extend past an outer edge of the lid 200 such that at least a portion of the arms 104 is supported on an outer rim of the lid 200. In addition, the lid holder 100 rests on an upper surface of the handle 204, such as due to contact between the lugs 112 and the upper surface of the handle 204. In this manner, the lid holder 100 is spaced apart from the upper surface of the lid 200 to prevent scratching of the cosmetic surface of the lid 200. Furthermore, the lugs 112 are positioned around the handle portion of the handle 204 to prevent removal of the lid holder 100 in a proximal direction. In this manner, the lid 200 can be carried by grasping the lid holder 100. For example, the lid 200 can now be lifted/lowered relative to the vessel 202 by grasping the arms 104 of the lid holder 100.

With reference to FIG. 7C, because the arms 104 are spaced apart from the upper surface of the lid 200, the arms 104 are at a lower temperature relative to the lid 200 during cooking. In this manner, the lid 200 can be lifted using the lid holder 100 without directly touching the hot surface of the lid 200. Furthermore, the lid holder 100 is shaped such that its center of mass is located closer to the base portion 102. In this manner, when the lid 200 is lifted from the vessel 202 using the lid holder 100, an edge of the lid 200 that is opposite the base portion 102 is lifted first, thereby allowing the steam to escape from the end of the vessel 202 that is furthest away from the user.

Figure 7D:
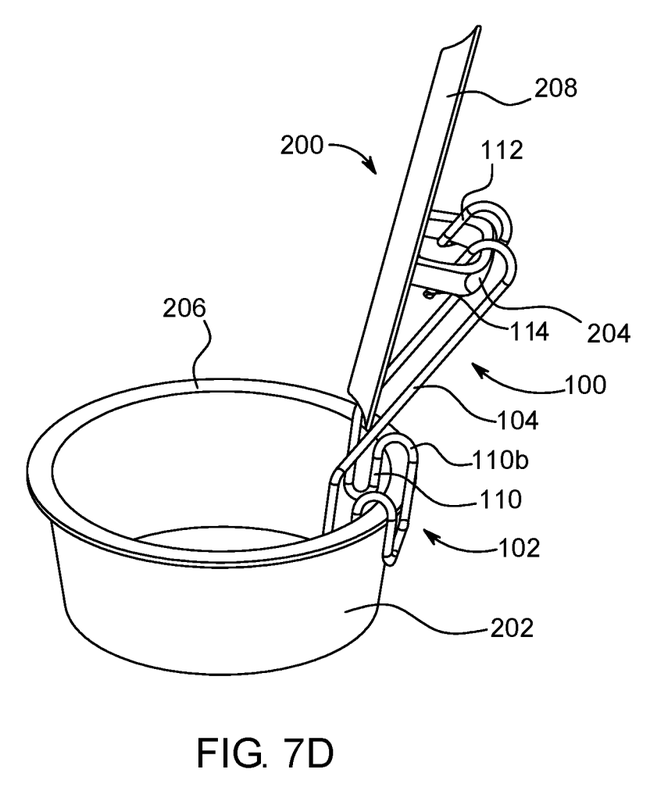

With reference to FIG. 7D, the lid holder 100 is configured to allow the lid 200 to be in a raised position on the cooking vessel 202. For example, the lid holder 100 can be positioned on a rim 206 of the cooking vessel 202 such that the rim 206 is disposed between the base portion 102 and the hook portion 110. Specifically, the lid holder 100 is positioned such that the rim 206 of the cooking vessel 202 is disposed between the base portion 102 and the second curved portion 110b of the hook portion 110. With shallower cooking vessels 202, such as frying pans, at least a portion of the base portion 102 may be supported on a surface on which the cooking vessel 202 is supported (see FIG. 8C). When placed in a raised position and supported by the lid holder 100, a bottom portion of the lid 200 is supported by the arms 100, while the vertical posts 204a of the handle 204 are supported on the legs 112 of the lid holder 100. The shape of the lid holder 100 is configured to maintain the lid 200 in an upright position to allow the condensation that may be accumulated on a bottom portion of the lid 200 to drain back into the cooking vessel 202. The shape of the lid holder 100, such as the angle of the base portion 102 relative to the arms 104 (angle F in FIG. 5) is selected such that the lid holder 100 maintains the center of gravity of the lid 200 at a position where the lid 200 will not be urged from the open position to the closed position on the cooking vessel 202.

Figure 8A:
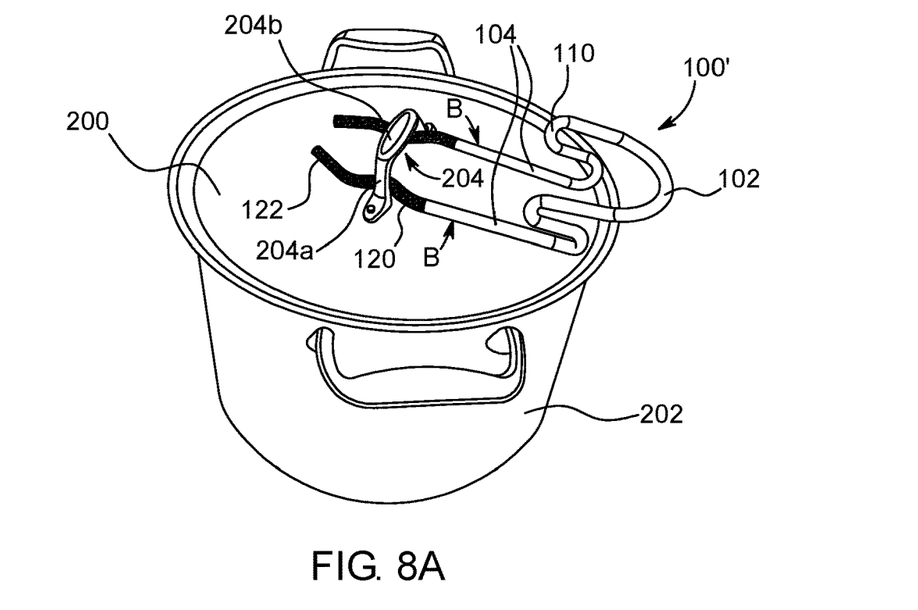
FIGS. 8A-8C are front perspective views of a lid holder in accordance with another preferred and non-limiting example of the present invention in use with a lid of a cooking vessel.
Figure 8B:
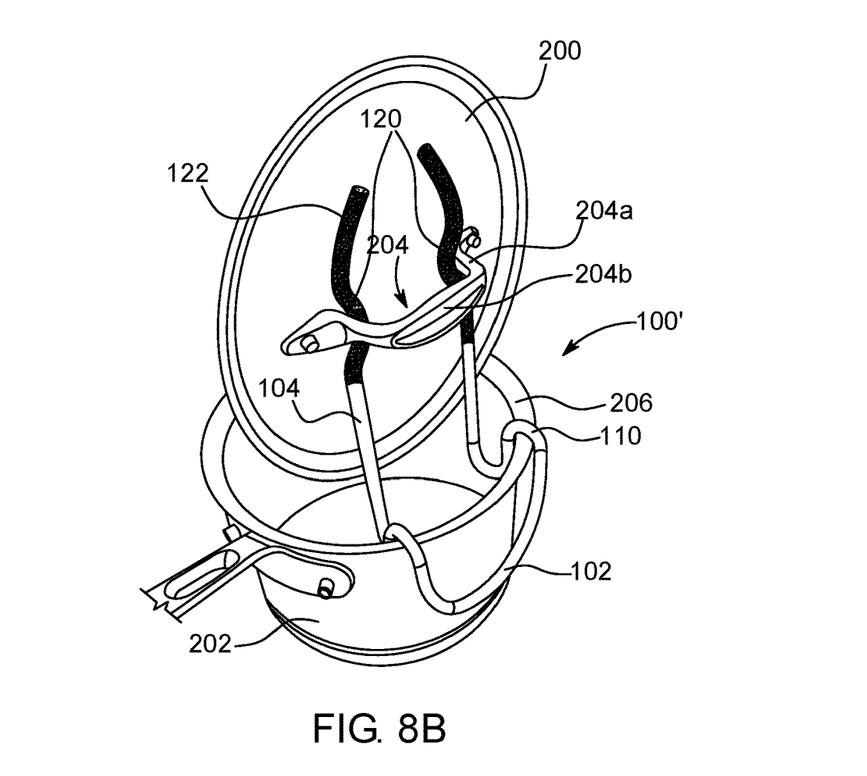
Figure 8C:
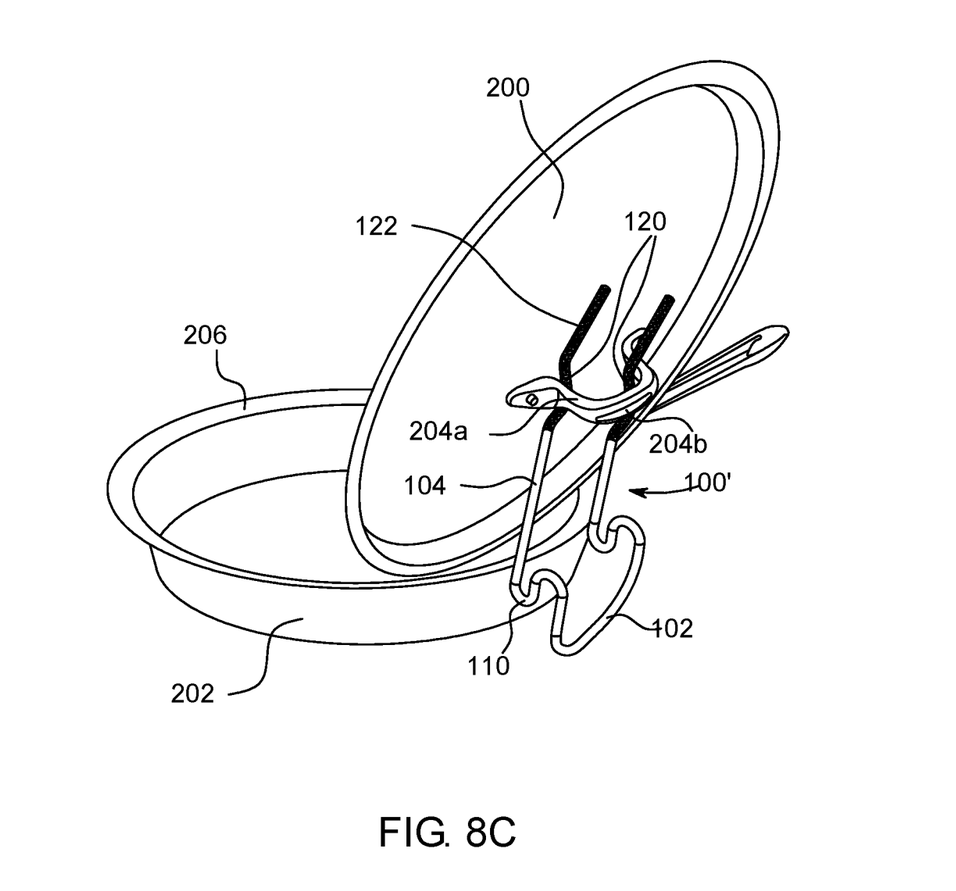

With reference to FIGS. 8A-8C, a lid holder 100' is shown in accordance with another preferred and non-limiting example. The features of the lid holder 100' shown in FIGS. 8A-8C are substantially similar or identical to the lid holder 100 shown in FIGS. 1-7D. Where appropriate, identical reference numerals are used to identify corresponding components between the lid holder 100' shown in FIGS. 8A-8C and the lid holder 100 shown in FIGS. 1-7D. Accordingly, the following discussion only focuses on the differences between the two lid holders.

With specific reference to FIGS. 8A-8B, the arms 104 have a curved portion 120 that is intermediate between the proximal end 106 and the distal end 108 of each arm 104. The curved portion 120 is shaped to define an indent in the arms 104 that is shaped to receive the inner side of the vertical posts of the handle 204 of the lid 200. By applying a force to the arms 104 in a direction of arrows B in FIG. 8A, the user can urge the arms 104 toward each other such that the curved portions 120 are also brought closer to each other. After urging or squeezing the arms 104 toward one another, the lid holder 100 is positioned such that the curved portions 120 are disposed between the vertical posts 204a of the handle 204. By releasing the squeezing force on the arms 104, the lid holder 100 becomes engaged with the handle 204 of the lid 200 due to engagement of the curved portions 120 of the arms 104 with the vertical posts 204a of the handle 204. The curved portions 120 are configured to prevent movement of the lid holder 100' relative to the handle 204 in a proximal or distal direction. Once installed, the lid holder 100' allows the lid 200 to be handled between a lowered position (shown in FIG. 8A) and an upright position (shown in FIGS. 8B-8C). At least a portion of the arms 104 may have a protective coating 122, such as a rubberized coating, to prevent scratching of the handle 204 and/or upper surface of the lid 200 when the lid holder 100' is connected to the lid 200.

Although the invention has been described in detail for the purpose of illustration based on what is currently considered to be the most practical and preferred examples, it is to be understood that such detail is solely for that purpose and that the invention is not limited to the disclosed examples, but, on the contrary, is intended to cover modifications and equivalent arrangements that are within the spirit and scope of the appended claims. For example, it is to be understood that the present invention contemplates that, to the extent possible, one or more features of any example can be combined with one or more features of any other example.

What is claimed is:

1. A lid holder constructed from a continuous length of a wire rod, the lid holder comprising:
  a base portion;
  a pair of arms spaced apart from each other, each arm having a proximal end connected to the base portion and a distal end extending away from the base portion;
  a U-shaped lug at the distal end of each arm, the lug having a first end connected to the distal end of each arm and a second end directed toward the base portion; and
  a leg connected to the second end of each U-shaped lug, the leg protruding in an outward direction away from the arms,
  wherein the arms are deflectable from a first, undeflected position to a second, deflected position with application of a deflecting force on at least a portion of at least one arm such that at least a portion of the arms is insertable between vertically extending posts of a lid handle and such that at least a portion of the U-shaped lug is positioned over a horizontal handling portion of the lid handle, and
  wherein, after the deflecting force is removed, the arms revert back from the second, deflected position toward the first, undeflected position, thereby engaging the legs of the U-shaped lug with vertically extending posts of the lid handle.

2. The lid holder of claim 1, wherein the base portion is U-shaped.

3. The lid holder of claim 1, wherein the proximal end of each arm is connected to the base portion by a hook portion.

4. The lid holder of claim 3, wherein the hook portion is S-shaped with a first curved portion and a second curved portion.

5. The lid holder of claim 4, wherein the first curved portion has a radius of curvature of 3 mm to 8 mm and wherein the second curved portion has a radius of curvature of 3 mm to 8 mm.

6. The lid holder of claim 1, wherein a major longitudinal axis of each lug is substantially parallel with the major longitudinal axis of the arm that the lug is connected to.

7. The lid holder of claim 1, wherein each lug has a radius of curvature of 6 mm to 10 mm.

8. The lid holder of claim 1, wherein the distal ends of the arms are angled away from one another.

9. The lid holder of claim 1, wherein the arms are parallel to one another.

10. The lid holder of claim 1, wherein a major longitudinal axis of the base portion is angled relative to a major longitudinal axis of the lid holder at an angle of 0° and 15°.

11. The lid holder of claim 1, wherein the legs and the U-shaped lug maintain the lid holder away from an upper surface of a lid to prevent scratching of the upper surface of the lid.

12. The lid holder of claim 1, wherein at least a portion of the lid holder has a protective coating configured to prevent scratching of the handle when the lid holder is connected to the lid.

13. The lid holder of claim 1, wherein the lid holder is constructed from the wire rod having a diameter of 3 mm to 6 mm.

14. The lid holder of claim 1, wherein the lid holder is made from stainless steel.

15. The lid holder of claim 1, wherein, when connected to a lid covering a cooking vessel, the lid holder and the lid are movable between a lowered position, where the lid engages a rim of the cooking vessel, and a raised position, where the lid holder engages the rim of the cooking vessel between the base portion and the hook portion.

16. The lid holder of claim 15, wherein a bottom portion of the lid is supported by the arms of the lid holder in the raised position.

17. The lid holder of claim 1, wherein, when connected to a lid covering a cooking vessel, the lid holder and the lid are movable between a lowered position, where the lid engages a rim of the cooking vessel, and a raised position, where the lid holder engages at least one of the rim of the cooking vessel and a surface supporting the cooking vessel.

18. The lid holder of claim 17, wherein a bottom portion of the lid is supported by the arms of the lid holder in the raised position.

19. The lid holder of claim 1, wherein the legs and the U-shaped lug maintain the lid holder away from an upper surface of a lid to prevent scratching of the upper surface of the lid.

\* \* \* \* \*